July 9, 1940.  J. C. ROGERS  2,207,358
COOKING STOVE OVEN
Filed July 29, 1939  2 Sheets-Sheet 1
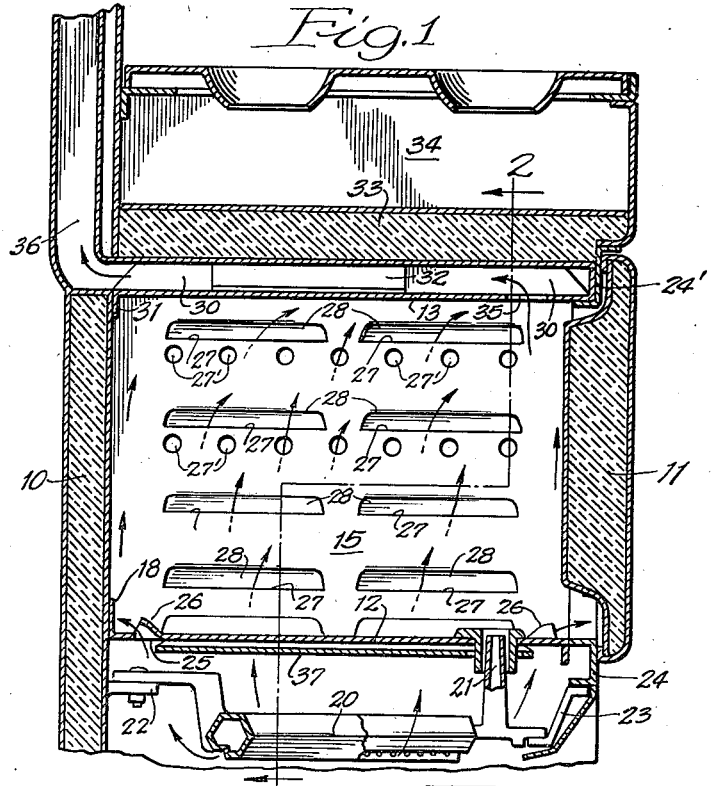
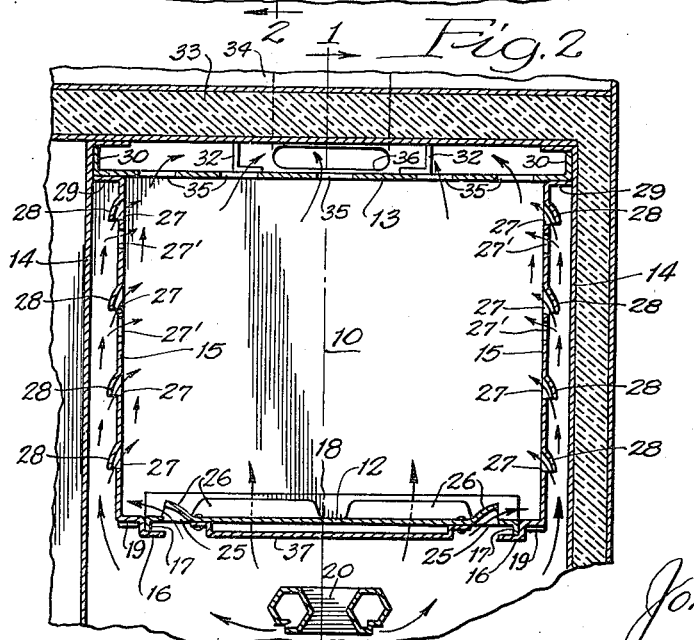
Inventor:
John C. Rogers,
By Fisher, Clapp, Soans Wood
Attorneys.

July 9, 1940.  J. C. ROGERS  2,207,358
COOKING STOVE OVEN
Filed July 29, 1939  2 Sheets-Sheet 2
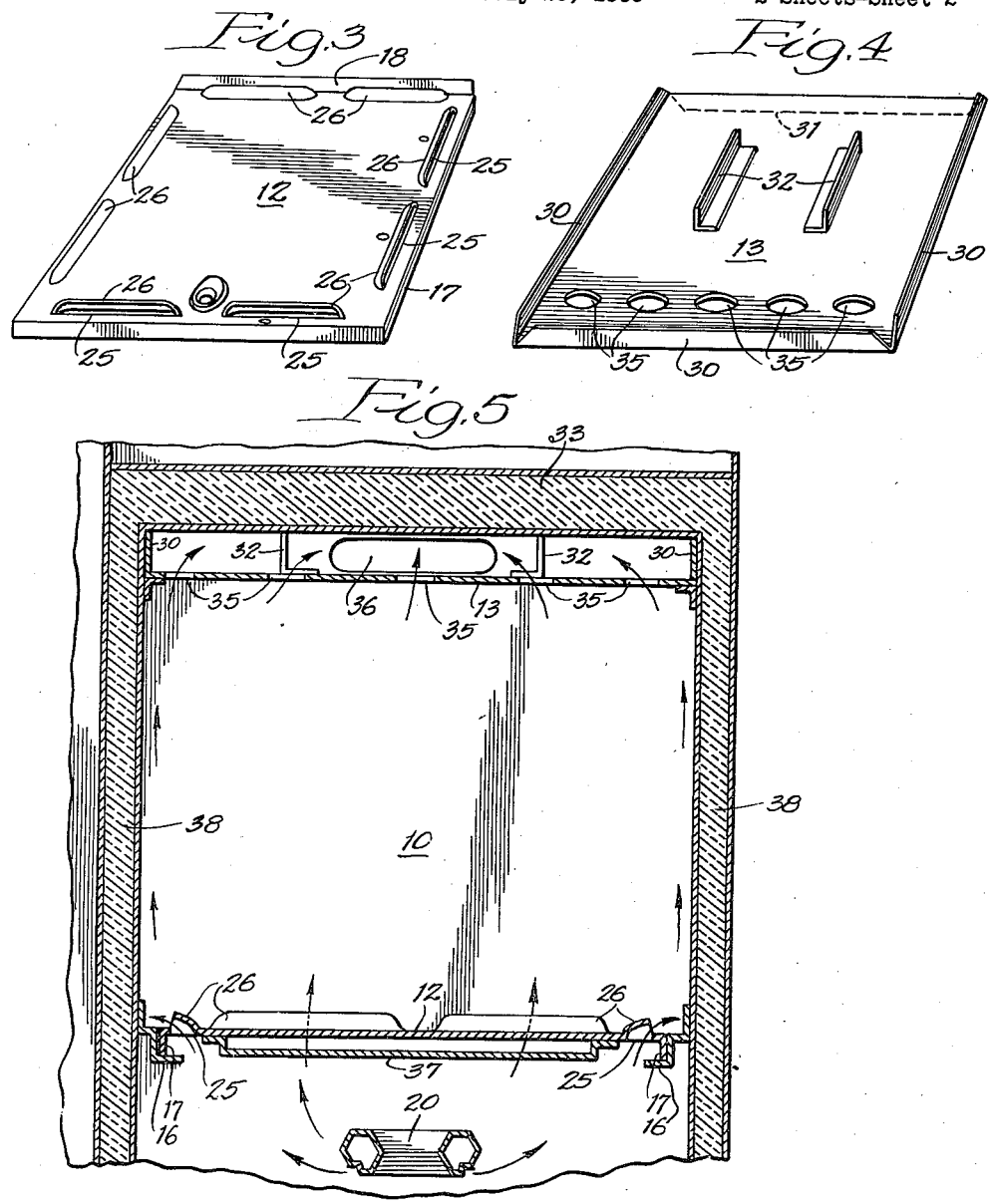

Patented July 9, 1940

2,207,358

UNITED STATES PATENT OFFICE 2,207,358

COOKING STOVE OVEN

John C. Rogers, Oak Park, Ill., assignor to Crown Stove Works, Cicero, Ill., a corporation of Illinois Application July 29, 1939, Serial No. 287,266

5 Claims. (Cl. 126—19)

This invention relates to oven structures for cooking stoves and ranges, and among the purposes and objects of the invention are; to provide an oven structure by which a baking heat of around 550 degrees may be more quickly reached than has been possible with known constructions, to provide a structure by which the heat may be more uniformly distributed throughout the entire space of the oven, to provide a structure affording an economy of fuel by causing more of the heat given off by the burner to enter the oven and less to go up the flue, and to provide a structure characterized by extreme simplicity and low cost of manufacture.

In a well known type of cooking stove, the burner is located directly beneath the floor of the oven and serves both the latter and the underlying broiler chamber. The oven is formed with spaced outer and inner side walls, the inner walls terminating short of the top wall, and the heated gases from the burner flow upwardly through the spaces between the inner and outer walls and thence out through the flue. This is known as indirect heating, since the oven is heated by conduction of heat through the bottom and inner side walls. In another less frequent type the burner is located in the floor of the oven, and the heated gases fill the oven space. This is known as direct heating, but it has not met with popular favor, owing to the difficulty of uniformly distributing the heat throughout the oven space.

My present invention, in one form thereof, combines the indirect and direct methods by a construction which effects a flow of the heated gases both through the oven itself and through the spaces between the inner and outer walls, and in another form improves the direct method by locating the burner beneath the oven floor and providing marginal louver openings therein through which the heated gases flow upwardly along the side walls and through openings in the top wall to the flue, thus avoiding concentration of the heat in the central or other localized region of the oven space.

Illustrative embodiments of the invention are shown in the accompanying drawings, wherein—

Fig. 1 is a vertical front to rear section through my improved oven, showing also the burner and its igniting tube, taken on the line 1—1 of Fig. 2.

Fig. 2 is a vertical section in a plane at right angles to that of Fig. 1, taken on the line 2—2 of Fig. 1.

Fig. 3 is a perspective detail of the bottom wall of the oven.

Fig. 4 is a perspective detail of the top wall of the oven.

Fig. 5 is a view similar to Fig. 2, showing an adaptation of the bottom and top plates to a direct heated oven.

Referring to Figs. 1 to 4 inclusive, 10 designates the rear wall and 11 the door of the oven structure. 12 designates the bottom wall and 13 the top wall of the oven. Each of the side walls consists of spaced outer and inner walls 14 and 15 respectively. The inner walls 15 are formed at their lower ends with inwardly and downwardly offset flanges 16 (Fig. 2), and the bottom wall 12 is formed on its side edges with depending flanges 17 (Fig. 2) by which the bottom wall 12 is removably supported on the flanges 16. The rear edge of the wall 12 has an upturned flange 18 that abuts against the rear wall 10 of the oven, and horizontal lips 19, cut and bent inwardly from the inner lining of the wall 10, form supports for the rear ends of the inner side walls 15.

Underlying the bottom wall 12 is the oven burner 20 equipped with the usual igniting tube 21 and supported at its rear end on a bracket 22 on the rear wall 10, and at its forward end on a bracket 23 attached to and depending from the lower front door frame member 24. In each of the four sides of the bottom wall 12 are formed marginal openings preferably taking the form of a pair of slots 25 (Fig. 3) that are covered by louvers 26 so formed as to direct the heated gases rising from the burner outwardly toward the inner side walls 15.

In each of the inner side walls 15 are vertically spaced slots 27, and beneath certain of said slots holes 27'; and overhanging the outer sides of said slots and holes are depending louvers 28. On the upper edges of the inner side walls 15 are horizontal flanges 29 that extend to the outer walls 14 and close the top of the spaces between the outer and inner side walls 14 and 15. These flanges 29 are spot welded or otherwise attached to the top wall 13.

The top wall 13, which is shown in isolated detail in Fig. 4, overlaps the flanges 29 of the side walls 15 and is formed on three sides with upwardly directed flanges 30, and on its fourth side with a downwardly directed flange 31. The flanges 30 lie against and are attached to the upper portions of the outer side walls 14 and the upper door frame member 24'; and the flange 31, as shown in Fig. 1, abuts against and is attached to the lining of the rear wall 10. A pair of angles 32 welded to the top of the top wall 13 bear at their upper edges on the lower side of a division wall 33 that separates the oven chamber from the overlying burner chamber 34, said angles 32 preventing upward buckling of the plate 13 under the heat. In the front portion of the top wall 13 is a row of holes 35 through which the heated gases from the oven flow into the space between the walls 13 and 33. Communicating with this space is the lower end of an exhaust flue 36.

The arrows in Figs. 1 and 2 show the upward course of the heated gases from the burner 20 to the exhaust flue 36. Some of the gases flow directly from the burner around the side edges of the bottom wall 12 into the spaces between the inner and outer side walls 15 and 14, as shown in Fig. 2, whence they are deflected by the louvers 28 through the openings 27 and holes 27' into the oven chamber. The rest of the gases flow through the openings 25 in the bottom wall 12 directly into the oven chamber, being deflected by the louvers 26 against all four vertical walls of the chamber, so that in their ascent they bathe the inner sides of the vertical walls. Since the spaces between the two side walls 14 and 15 are closed off at their upper ends, all of the gases from the burner find their way into the oven chamber, a part directly and a part indirectly. Thence they flow through the holes 35 of the top wall into the space between the walls 13 and 33, and thence find their exit through the flue 36. By this construction, localization of the heated gases in the oven chamber is prevented, and the gases are very uniformly distributed throughout the entire chamber, and the temperature of the latter rises rapidly to the required heat for baking or roasting. Practical tests with the described construction have shown that a heat of approximately 550 degrees is attained within a period of about eleven minutes.

A heat deflecting plate 37 secured to and underlying the intermediate portion of the bottom wall 12 forms an air chamber so that the burner flames do not strike the bottom plate and unduly heat the latter in the region directly above the burner. This last described feature is old and known, and no claim thereto is made herein.

In Fig. 5 I illustrate a direct heating construction wherein the oven has single heat insulated side walls 38. Bottom and top walls 12 and 13 are structurally identical with the corresponding walls shown and described in Figs. 1 to 4 inclusive; and the only difference in operation is that all of the heated gases flow directly upwardly through the louver covered openings 25 into the oven chamber, as indicated by the arrows; whereas in the structure of Figs. 1 to 4 some of the heated gases enter the oven chamber at spaced points along the height of the latter.

Since the structural parts of the described oven are largely of sheet metal fabricated by simple stamping operations, the structure is very light, and the cost of manufacture is low.

The details of structure and arrangement may obviously be modified within the spirit and scope of the invention as defined in the appended claims.

I claim:

1. A stove oven having a rectangular bottom wall formed with marginal openings along all four sides thereof communicating with the interior of the oven, louvers covering said openings and so formed as to direct the heated gases against the lower portions of the vertical walls of the oven, and a burner located centrally beneath said bottom wall.

2. An embodiment of the structure defined in claim 1, wherein opposite vertical walls of the oven are equipped at their lower ends with horizontal ledges, and the bottom wall is removably supported on said ledges.

3. An embodiment of the structure defined in claim 1, wherein opposite vertical walls of the oven are equipped at their lower ends with horizontal ledges, and the bottom wall has down turned marginal flanges stepped on said ledges.

4. In combination with the structure defined in claim 1, a top oven wall defining a chamber communicating with a flue, said top wall having openings for the outflow of heated gases from the oven to said chamber.

5. In combination with the structure defined in claim 1, a top oven wall defining a chamber communicating with a flue, said top wall having a row of openings adjacent to its front edge for the outflow of heated gases from the oven to said chamber.

JOHN C. ROGERS.